(12) United States Patent
Wong

(10) Patent No.: US 6,196,679 B1
(45) Date of Patent: Mar. 6, 2001

(54) ASSEMBLY INCLUDING MUTUALLY COOPERATING AND INTERFITTING PROJECTIONS FOR RELEASABLE ENGAGEMENT OF AN AUXILIARY GLASSES FRAME TO A PAIR OF SPECTACLES

(76) Inventor: Edmund Wong, Unit 1202, 12/F, Tower A, Regent Centre 63 WO Yi Hop Road, Kwai Chung, N.T. (HK)

( * ) Notice: Subject to any disclaimer, the term of this patent is extended or adjusted under 35 U.S.C. 154(b) by 0 days.

(21) Appl. No.: 09/224,713

(22) Filed: Dec. 31, 1998

(30) Foreign Application Priority Data

Aug. 28, 1998 (AU) ................................................ PP5547

(51) Int. Cl.[7] ................................................ G02C 9/00
(52) U.S. Cl. ................................................ 351/47; 351/57
(58) Field of Search ................................................ 351/47, 57, 41, 351/158

(56) References Cited

U.S. PATENT DOCUMENTS

| | | |
|---|---|---|
| 5,416,537 | 5/1995 | Sadler . |
| 5,568,207 | 10/1996 | Chao . |
| 5,929,964 | * 7/1999 | Chao ..................................... 351/47 |

FOREIGN PATENT DOCUMENTS

| | | |
|---|---|---|
| 684423 | 12/1997 | (AU) . |
| 2235818 | 10/1998 | (CA) . |
| 2235798 | 10/1998 | (CA) . |
| 2235088 | 10/1998 | (CA) . |

* cited by examiner

Primary Examiner—Hung Xuan Dang
(74) Attorney, Agent, or Firm—Birch, Stewart, Kolasch & Birch, LLP

(57) ABSTRACT

An assembly enabling detachable fitting of a pair of auxiliary lenses to a pair of primary spectacles; the assembly including a pair of projections on a primary spectacle frame each having a recess or opening which each receive a corresponding projection on an auxiliary frame which holds the pair of auxiliary lenses. The arrangement is such that each projection on the auxiliary frame positively engages an opening on a corresponding projection on the primary spectacle frame.

12 Claims, 2 Drawing Sheets

ASSEMBLY INCLUDING MUTUALLY COOPERATING AND INTERFITTING PROJECTIONS FOR RELEASABLE ENGAGEMENT OF AN AUXILIARY GLASSES FRAME TO A PAIR OF SPECTACLES

BACKGROUND OF THE INVENTION

1. Field of the Invention

The present invention relates to eye glasses and more particularly relates to improved arrangements for attachment of a second or auxiliary pair of lenses to such eye glasses. More particularly, the invention relates to the provision of mutually cooperating and interfitting projections on primary and auxiliary or secondary lenses enabling the releasable mechanical engagement between the primary and secondary lenses.

2. Description of Related Art

Wearers of eye glasses often choose to attach a second set of lenses to those eye glasses to provide sunshade and ultra violet eye protection. This prevents having to keep a separate pair of sun glasses and it also means the wearer can still derive the visual acuity from the prescription lenses whilst deriving the benefits of sun glasses. There are already in existence various clip on secondary lenses for detachable fixation to a primary pair of lenses such that the latter are instantly converted into sung glasses. Means of attachment of the secondary lenses has in the past taken various forms. One version employs clips which engage a bridge on the primary spectacles.

Another arrangement for detachably attaching a secondary pair of lenses to a pair of primary spectacles is described in Australian patent 684423. The patent discloses an eye glass comprising a spectacle frame support for supporting primary lenses including side portions each having an extension for pivotally coupling a leg means and two rear side portions each having a protection secured thereto. The primary spectacle frame also including an upper side portion and a pair of first magnetic members secured in the projections. The eye glasses further comprise an auxiliary spectacle frame for supporting auxiliary lenses including two side portions each having an arm extending therefrom for extending over and for engaging with the upper side portion of the primary spectacle frame such that the auxiliary lenses are held against the primary spectacle frame by means of the magnetic members.

Whilst the clip arrangements and magnetic interengagement works to secure the auxiliary lenses to the primary frame, these methods suffer from a number of disadvantages. The clip arrangement is cumbersome, heavy and unattractive and according to some versions can lead to scratching of the primary lenses when the auxiliary lenses is fitted to the primary spectacle frame. The magnetic arrangements described in Australian patent 684423 have also been disclosed in U.S. Pat. No. 5,416,537 to Sadler and U.S. Pat. No. 5,568,207 by Richard Chao. One of the problems with the magnetic arrangements is that in time the magnetism degrades, dramatically reducing the effectiveness of the interfitting. Even where the magnetism is at its strongest when the frames are first manufactured, the magnetic forces may not be enough made to withstand dynamic loading which may be placed on the auxiliary frames particularly where the user is engaged in sports such as jogging, jumping, tennis and other like activities. When a user is engaged in vigorous exercise the auxiliary spectacle frame can be instantly released from the primary spectacle frames leading to damage of the auxiliary spectacle frames and inconvenience to the user.

In addition, the magnetic surface in the projections on the primary frame may be prone to corrosion and rust, degrading magnetic effectiveness. A further problem is that where the auxiliary frames are not released from the primary spectacle frames, they can move on the primary frames as the magnetic surfaces allow a range of movement over the surface area of the magnet. This has the disadvantage of increasing the gap between the auxiliary frames and the primary spectacles allowing sun light to penetrate through the lenses in the primary spectacle frames reducing the overall effectiveness of the interengagement between the auxiliary lenses and the primary spectacle lenses.

SUMMARY OF THE INVENTION

The present invention seeks to provide a solution to the above problems by providing an alternative means of engagement between auxiliary spectacles and a primary spectacle frame.

In accordance with this it is one object of the invention to provide a mechanism to allow positive but releasable fixation of auxiliary lenses to a primary spectacle frame. It is a further object of the invention to provide an arrangement which allows positive interfitting such that unwanted release of the auxiliary frames from the primary spectacle frames cannot occur.

According to the present invention, there are provided eyeglasses including a primary spectacle frame for supporting primary lenses therein, the primary spectacle frame including two side portions each having an extension extending therefrom for pivotally coupling a leg means thereto, the primary spectacle frame including two rear and side portions each having a projection secured thereto, the primary spectacle frame including an upper portion, a pair of rings secured in the projections respectively wherein the rings are each embedded with a spring wire circle inside, an auxiliary spectacle frame for supporting auxiliary lenses therein, the auxiliary spectacle frame including two side portions each having an arm extending therefrom for extending over and for engaging with the upper portion of the primary spectacle frames, and a pair of locking projections secured to the arms respectively for engaging with the rings of the primary spectacle frame so as to secure the auxiliary spectacle frame to the primary spectacle frame.

According to a preferred embodiment, the interfitting assembly between the auxiliary spectacle frames and the primary spectacle frames comprises annular projections on the primary frame at or near the extremity of the lenses each projection including an annular recess which receives a spring wire which provides locking once corresponding projections on the auxiliary lenses have penetrated the annular recess in a corresponding projection on the primary spectacle frame. The spring wire enables positive locking as it displaces momentarily when the projections on the auxiliary lens penetrate the recesses formed by the projections on the primary spectacle frame. This enables snap fitting between the primary and auxiliary lenses and prevents unwanted disengagement.

In its broadest form the present invention comprises;

a pair of primary spectacles which releasably engage an auxiliary spectacle frame such that auxiliary lenses in the auxiliary frame are, partially or completely, superimposed over primary lenses in the pair of primary spectacles when the auxiliary spectacle frame is fitted to the pair of primary spectacles;

said pair of primary spectacles including;

a primary frame having primary frame openings separated by a primary bridge to receive and retain said primary lenses;

primary extension members which pivotally engage arm members each having a free and which engages an ear of a wearer;

first and second primary projections, each having an opening;

said auxiliary spectacle frame including;

an auxiliary frame having auxiliary frame openings which hold auxiliary lenses and which are separated by an auxiliary bridge; and first and second auxiliary projections extending from the auxiliary frame, wherein the auxiliary spectacle frame may be detachably fixed to the pair of primary spectacles by mechanical engagement between the first and second auxiliary projections on the auxiliary spectacle frame and respective openings in the first and second primary projections extending from the primary frame.

According to a preferred embodiment one of the primary projections on the primary frame is located on each wing and each primary projection includes a substantially annular opening having retained therein a ring spring or clip which allows snap fit engagement with an auxiliary projection on the auxiliary frame.

In another broad form the invention comprises;

an assembly enabling detachable fitting of a pair of auxiliary lenses to a primary spectacle frame; the assembly including a pair of projections on the primary spectacle frame each having a recess or opening which each receive a corresponding projection on a frame of the auxiliary lenses such that each projection on the auxiliary frame positively engages said recess or opening in or on a corresponding projection on the said primary spectacle frame.

In another broad form the present invention comprises;

a pair of auxiliary lenses for fitting to a pair of spectacles including a lens frame having projections which positively engage with a recess in or on corresponding projections on a primary spectacle frame to thereby effect detachable engagement between the auxiliary lenses and the primary spectacles.

In another broad form the present invention comprises;

a pair of primary spectacles including a primary lens frame having projections which positively engage with a recess in or on corresponding projections on an auxiliary spectacle frame to thereby effect detachable engagement between the auxiliary lenses and the primary spectacles.

According to a preferred embodiment the projections mate in snap fit engagement. In an alternative embodiment, the recess or opening may be included on the primary spectacles and can be of any shape.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will now be described in more detail according to a preferred but non limiting embodiment of the invention wherein.

DESCRIPTION OF THE PREFERRED EMBODIMENTS

Figure 1:
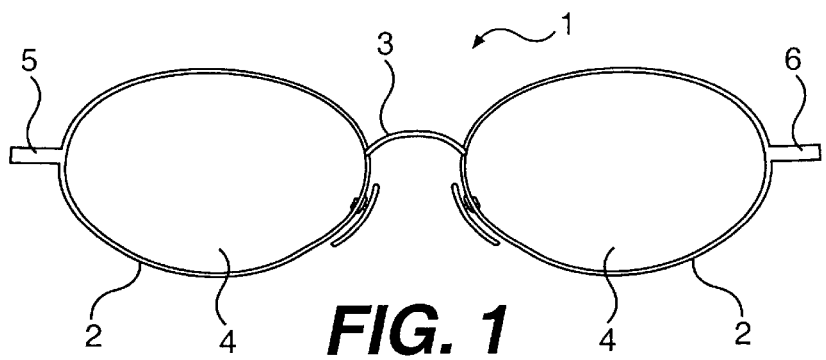
FIG. 1: shows a front elevation of a primary spectacle frame.

Referring to FIG. 1 there is shown a pair of spectacles 1 including a primary spectacle frame 2, for holding primary lenses 4 and including bridge 3.

Figure 3:
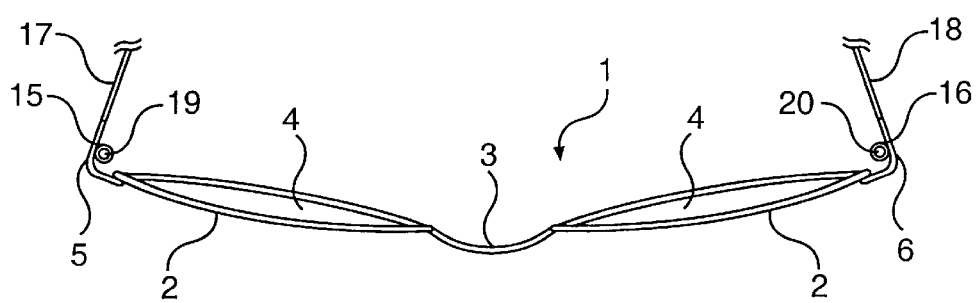
FIG. 3: shows a top view of the primary frame of FIG. 1.

FIG. 3 shows an auxiliary pair of spectacles 7 comprising auxiliary frame 8 for holding auxiliary lenses 10 and including auxiliary bridge 9. The auxiliary frame further comprises auxiliary extension portions 11 and 12 which include auxiliary projections 13 and 14.

FIG. 3 shows a top view of the pair of primary spectacles 1 of FIG. 1 with corresponding parts bearing the same numbers as shown in FIG. 1. Primary spectacles 1 further comprise primary projections 15 and 16 which include recesses 19 and 20 respectively. Primary projections 15 and 16 are preferably annular and are attached to arms 17 and 18 of the primary spectacle frame 1. Interengagement between auxiliary lens 7 and primary spectacles 1 takes place by engagement between auxiliary projections 13 and 14 of auxiliary frame 7 and primary projections 15 and 16 of primary spectacle frame 1. Primary projections 15 and 16 include recesses 19 and 20 which receive auxiliary projections 13 and 14 respectively, preferably by a snap fit engagement.

Figure 2:
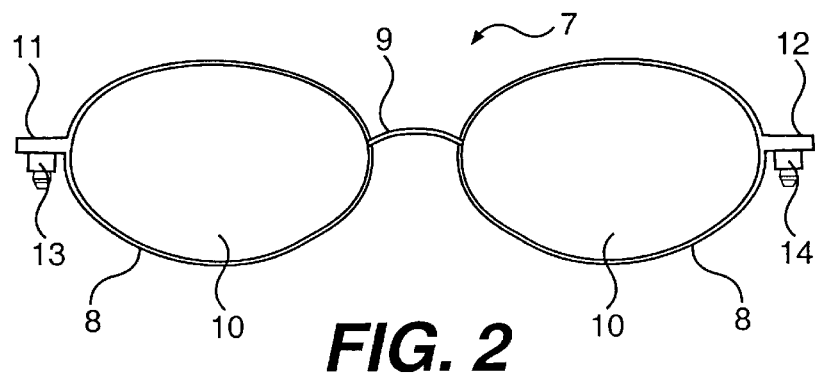
FIG. 2: shows a front elevation of an auxiliary spectacle frame.
Figure 4:
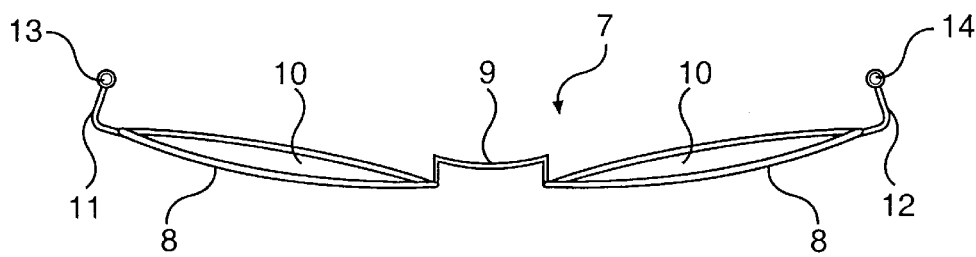
FIG. 4: shows a top view of the auxiliary frame of FIG. 2.
Figure 5:
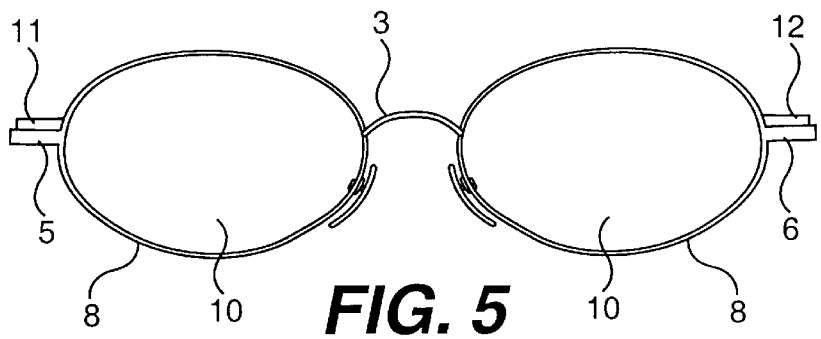
FIG. 5: shows a front view of the frames of FIGS. 1 and 2 in interfitting engagement.
Figure 6:
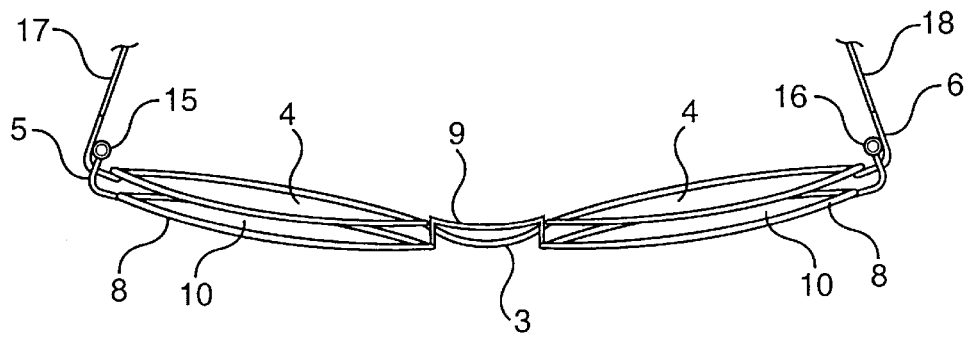
FIG. 6: shows a top view of the arrangement of FIG. 5.

FIG. 4 shows the auxiliary frames of FIG. 2 showing the preferred location of auxiliary projections 13 and 14 relative to auxiliary frame 8. FIGS. 5 and 6 show respectively elevation and top views of frames 1 and 7 of FIGS. 1 and 2 respectively, when coupled together. FIG. 6 is numbered according to the corresponding features found in FIGS. 1 and 2.

Figure 7:
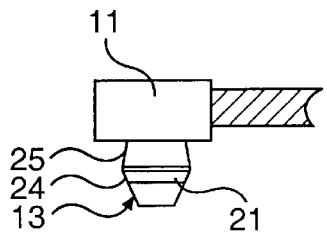
FIG. 7: shows a typical projection on an auxiliary frame at an approximate scale of 5:1.

Referring to FIG. 7, there is shown an enlarged view of auxiliary projection 13 as shown in FIG. 2. Auxiliary projections 13 and 14 shown in FIG. 2 are preferably identical so the detail of the projection will be described with reference to projection 13. Auxiliary projection 13 downwardly depends from auxiliary extension 11 and is preferably cone shaped.

Figure 7A:
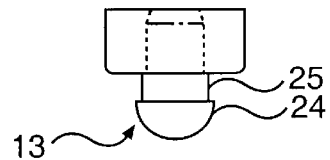
FIG. 7A: shows an alternative embodiment of a typical projection on an auxiliary frame at a approximate scale of 5:1.

FIG. 7A shows an alternative embodiment of auxiliary projections 13. It can be seen that both embodiments of auxiliary projection 13 include a head section 24 and a body section 25 wherein at least a part of the head section 24 has a larger diameter than at least part of the body section 25.

Figure 8:
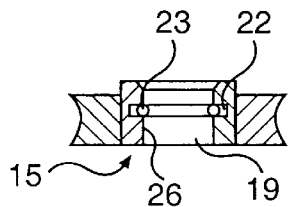
FIG. 8: shows a typical projection on primary spectacle frame at an approximate scale of 5:1.
Figure 8A:
FIG. 8A: shows the incomplete ring clip 23 in plan view.

FIG. 8 shows a typical primary projection 15 which may be located on primary extension 5 or arm 17. Preferably, primary projections 15 and 16 are identical, in which case only projection 15 will be described. Projection 15 comprises bottomless opening 19 which is proportioned to receive auxiliary projection 13 from an axial direction. Bottomless opening 19 includes an inner surface 26 having an annular recess 22 therein for receiving and retaining an incomplete ring clip 23. FIG. 8A shows the incomplete ring clip 23 in plan view.

Upon insertion of auxiliary projection 13 into bottomless opening 19, the head section 24 acts to momentarily increase the diameter of the incomplete ring clip 23 to allow the auxiliary projection 13 to fit snugly in said bottomless opening 19 whereupon the deflected ring clip 23 returns to its original diameter around the body section 25 of the auxiliary projection 13, thereby securing locking engagement between said auxiliary projection 13 and said primary projection 19.

In alternative embodiments, the projections may be configured differently from that shown in the preferred embodiment provided there is a positive mechanical male-female or female-male interfitting. Thus the auxiliary spectacle frame may have a female recess in its projection instead of a male projection. Likewise the primary spectacle frame may have projections which are male instead of female.

It will be recognised by persons skilled in the art that numerous variations and modifications may be made to the invention as broadly described herein without departing from the overall spirit and scope of the invention. In this regard the location and shape of projections may be altered but it is generally preferred that these be in the region of the outward extremity of the frames, both the auxiliary and primary spectacle frames.

The claims defining the invention are as follows:

1. An assembly enabling detachable fitting of a pair of auxiliary lenses to a pair of primary spectacles; the assembly including a pair of primary spectacles which releasably engage an auxiliary spectacle frame such that auxiliary lenses in the auxiliary frame are superimposed over primary lenses in the pair of primary spectacles when the auxiliary spectacle frame is fitted to the pair of primary spectacles;

said pair of primary spectacles including;
a primary frame having primary frame openings to receive and retain said primary lenses, said primary frame opening being separated by a primary bridge;
primary extension members which pivotally engage arm members each having a free end which engages an ear of a wearer;
first and second primary projections, each having a bottomless opening, each bottomless opening including an inner surface having an annular recess therein for receiving and retaining an incomplete ring clip;

said auxiliary spectacle frame including:
an auxiliary frame having auxiliary frame openings which hold auxiliary lenses and which are separated by an auxiliary bridge; and
first and second auxiliary projections extending therefrom, said auxiliary projections each having a head section and a body section wherein at least a part of the head section has a larger diameter than at least part of the body section, such that, upon insertion of said auxiliary projections into said bottomless openings, said head sections act to momentarily increase the diameter of said incomplete ring clips to allow the auxiliary projections to fit snugly in said bottomless openings whereupon the deflected ring clips return to their original diameter around the body section of the auxiliary projections, thereby securing locking engagement between said auxiliary projections and said primary projections.

2. An assembly as claimed in claim 1 wherein at least one of the primary projections is located on an arm of the primary frame.

3. An assembly as claimed in claim 1 wherein at least one of the primary projections is located on a primary extension member of the primary frame.

4. An assembly as claimed in claim 1 wherein the primary projection openings are located on the auxiliary spectacles and the auxiliary projections are located on the primary spectacles.

5. An assembly enabling detachable fitting of a pair of auxiliary lenses to a pair of primary spectacles; the assembly including a pair of projections on a primary spectacle frame each having a bottomless opening which includes an inner surface having an annular recess therein for receiving and retaining an incomplete ring clip; and a corresponding auxiliary projection on an auxiliary frame which holds said pair of auxiliary lenses, said auxiliary projections each having a head section and a body section wherein at least part of the head section has a larger diameter than the body section such that, upon insertion of said auxiliary projections into said openings, said head sections act to momentarily increase the diameter of said incomplete ring clips to allow the auxiliary projections to fit snugly in said bottomless openings whereupon the deflected ring clips return to their original diameter around the body section of the auxiliary projections, thereby securing locking engagement between said auxiliary projections and said primary projections.

6. An assembly as claimed in claim 5 wherein at least one of the primary projections is located on an arm of the primary frame.

7. An assembly as claimed in claim 5 wherein at least one of the primary projections is located on a primary extension member of the primary frame.

8. An assembly as claimed in claim 5 wherein the primary projection openings are located on the auxiliary spectacles and the auxiliary projections are located on the primary spectacles.

9. An assembly enabling detachable fitting of a pair of auxiliary lenses to a pair of primary spectacles, the assembly including a pair of auxiliary lenses for fitting to a pair of primary spectacles including an auxiliary lens frame having auxiliary projections which positively engage with at least one bottomless opening corresponding primary projections on a primary spectacle frame; said auxiliary projections each having a head section and a body section wherein at least part of the head section has a larger diameter than the body section and wherein said bottomless openings each include an inner surface having an annular recess therein for receiving and retaining an incomplete ring clip; such that, upon insertion of said auxiliary projections into said openings, said head sections act to momentarily increase the diameter of said incomplete ring clips to allow the auxiliary projections to fit snugly in said bottomless openings whereupon the deflected ring clips return to their original diameter around the body section of the auxiliary projections, thereby securing locking engagement between said auxiliary projections and said primary projections.

10. An assembly as claimed in claim 9 wherein at least one of the primary projections is located on an arm of the primary frame.

11. An assembly as claimed in claim 9 wherein at least one of the primary projections is located on a primary extension member of the primary frame.

12. An assembly as claimed in claim 9 wherein the primary projection openings are located on the auxiliary spectacles and the auxiliary projections are located on the primary spectacles.

* * * * *